(12) United States Patent
Casby et al.

(10) Patent No.: US 7,442,466 B2
(45) Date of Patent: Oct. 28, 2008

(54) ACCESS PORT FOR USE IN ELECTROCHEMICAL CELLS

(75) Inventors: Kurt J. Casby, Grant, MN (US); David P. Haas, Brooklyn Park, MN (US); Hailiang Zhao, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 217 days.

(21) Appl. No.: 11/343,697

(22) Filed: Jan. 31, 2006

(65) Prior Publication Data

US 2007/0177448 A1  Aug. 2, 2007

(51) Int. Cl.
*H01M 2/00* (2006.01)
*H01M 2/38* (2006.01)
*B23K 31/02* (2006.01)

(52) U.S. Cl. ........................ 429/163; 429/80; 228/124.6

(58) Field of Classification Search .................... 429/80, 429/163; 365/230.05; 219/121.64; 228/124.6; 29/6.1
See application file for complete search history.

(56) References Cited

U.S. PATENT DOCUMENTS

| | | | | |
|---|---|---|---|---|
| 4,414,460 A | * | 11/1983 | Sudo et al. | 219/121.64 |
| 4,442,578 A | * | 4/1984 | White | 29/898.058 |
| 5,131,388 A | * | 7/1992 | Pless et al. | 607/5 |
| 6,012,942 A | * | 1/2000 | Volstorf | 439/397 |
| 6,141,205 A | | 10/2000 | Nutzman et al. | |
| 6,157,531 A | | 12/2000 | Breyen et al. | |
| 6,434,820 B1 | * | 8/2002 | Volstorf | 29/874 |
| 6,844,106 B2 | | 1/2005 | Heller et al. | |
| 2003/0017390 A1 | | 1/2003 | Probst et al. | |
| 2003/0088293 A1 | | 5/2003 | Clarke et al. | |
| 2004/0064163 A1 | | 4/2004 | Aamodt et al. | |
| 2004/0137319 A1 | | 7/2004 | Warchocki et al. | |
| 2004/0260354 A1 | * | 12/2004 | Nielson et al. | 607/37 |
| 2005/0112460 A1 | | 5/2005 | Howard et al. | |

* cited by examiner

*Primary Examiner*—Dah-Wei Yuan
*Assistant Examiner*—Alexander Chuang
(74) *Attorney, Agent, or Firm*—Carol F. Barry

(57) ABSTRACT

An electrochemical cell, comprising: an encasement including a case having a bottom and a sidewall terminating at an open top and a cover disposed over the case open top and hermetically sealed to the case, the encasement defining an interior space for containing cell components; and an access port defining at least one lumen extending through any of the case bottom, the case sidewall or the cover for receiving a liquid electrolyte, the access port being sealed closed after receiving the liquid electrolyte using a fusion welding method in the presence of the electrolyte.

20 Claims, 6 Drawing Sheets

ACCESS PORT FOR USE IN ELECTROCHEMICAL CELLS

TECHNICAL FIELD

The invention relates generally to electrochemical cells, and, more particularly, to configurations of access ports for electrochemical cells that may be used in implantable medical devices.

BACKGROUND

Implantable medical devices are used to treat patients suffering from a variety of conditions. Examples of implantable medical devices include implantable pacemakers and implantable cardioverter-defibrillators (ICDs), which are electronic medical devices that monitor the electrical activity of the heart and provide electrical stimulation to one or more of the heart chambers as necessary. Pacemakers deliver relatively low-voltage pacing pulses in one or more heart chambers. ICDs can deliver high-voltage cardioversion and defibrillation shocks in addition to low-voltage pacing pulses Pacemakers and ICDs generally include pulse generating circuitry required for delivering pacing and/or cardioversion and defibrillation pulses, control circuitry, telemetry circuitry, and other circuitry that require an energy source, e.g. at least one battery. In addition to a battery, ICDs include at least one high-voltage capacitor for use in generating high-voltage cardioversion and defibrillation pulses. Implantable medical devices (IMDs), including pacemakers, ICDs, drug pumps, neurostimulators, physiological monitors such as hemodynamic monitors or ECG monitors, typically require at least one battery to power the various components and circuitry used for performing the device functions.

IMDs are preferably designed with a minimal size and mass to minimize patient discomfort and prevent tissue erosion at the implant site. Batteries and capacitors, referred to collectively herein as "electrochemical cells," contribute substantially to the overall size and mass of an IMD. Electrochemical cells used in IMDs are provided with a hermetically-sealed encasement for housing an electrode assembly, including an anode and cathode separated by a separator material, a liquid electrolyte, and other components such as electrode connector feed-throughs and lead wires. The encasement includes a case and a cover that are sealed after assembling the cell components within the case.

An access port, often referred to as a "fill port", provides an opening through the encasement for filling the cell with a liquid electrolyte after sealing the cover to the case. Fill ports typically include a fill tube extending through the encasement, often through a sidewall of the case, surrounded by a ferrule welded to the sidewall to support the fill port components. After filling the encasement with a liquid electrolyte, the fill port is welded closed to form a hermetic seal. The fill port is typically welded closed using a filler member or material, such as a ball, button or cap, placed in the lumen of the fill port tube. The filler separates the electrolyte liquid and other internal cell components from the weld joint. Examples of fill ports including a filler member or material are generally described in U.S. Pat. No. 6,157,531 (Breyen et al.), U.S. Pat. No. 6,844,106 (Heller et al.) and U.S. Pat. Application Publication No. 2004/0064163 (Aamodt et al.). The encasement wall is generally made thick enough to support the fill port components and to withstand swelling that occurs as the cell discharges.

As it is desirable to minimize overall IMD size, electrochemical cell designs, including access port designs that allow cell size and mass to be reduced are desirable. Reduction of electrochemical cell size may allow balanced addition of volume to other IMD components, thereby increasing device longevity and/or increasing device functionality. Other electrochemical cell design considerations motivating new cell designs include reducing manufacturing cost and time.

DETAILED DESCRIPTION

In the following description, references are made to illustrative embodiments for carrying out the invention. It is understood that other embodiments may be utilized without departing from the scope of the invention.

Figure 1:
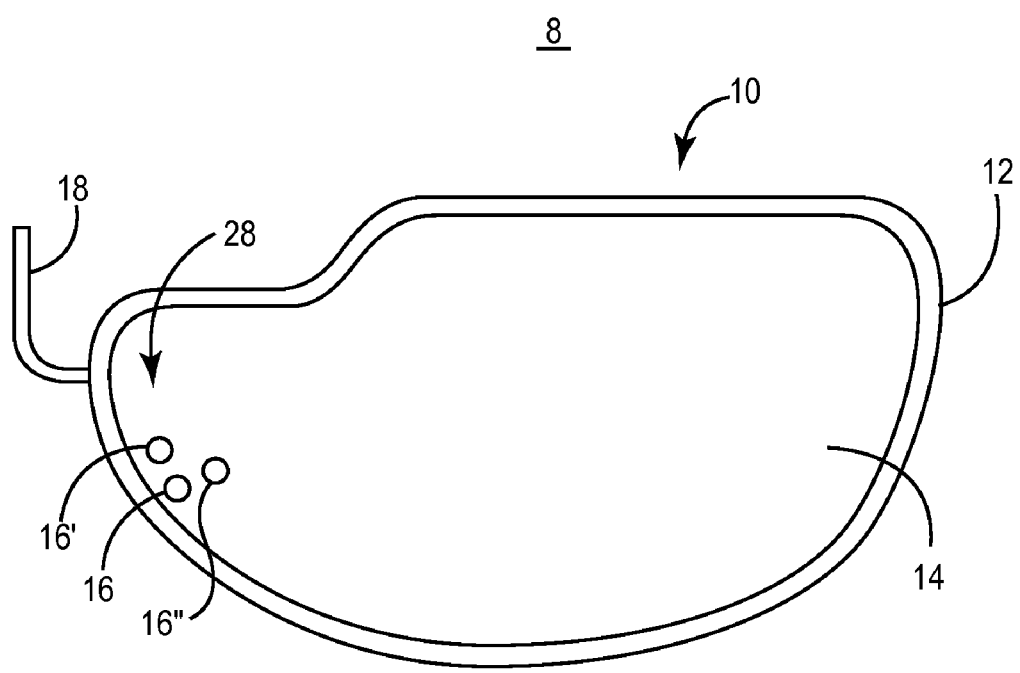
FIG. 1 is a top view of an electrochemical cell according to one embodiment of the invention.

FIG. 1 is a top view of an electrochemical cell according to one embodiment of the invention. Cell 8 includes an encasement 10 for housing internal cell components. Encasement 10 includes a case 12 and a cover 14. A terminal lead wire 18 is shown extending from a header portion 28 of encasement 10. Multiple access ports 16, 16' and 16" are shown which extend through cover 14 for facilitating filling encasement 10 with a liquid electrolyte after cover 14 is sealed to case 12. In the particular embodiment shown, three access ports 16, 16' and 16" are provided, however, in various embodiments of the invention one or more access ports may be provided extending through any portion of case 12 and/or cover 14.

Figure 2:
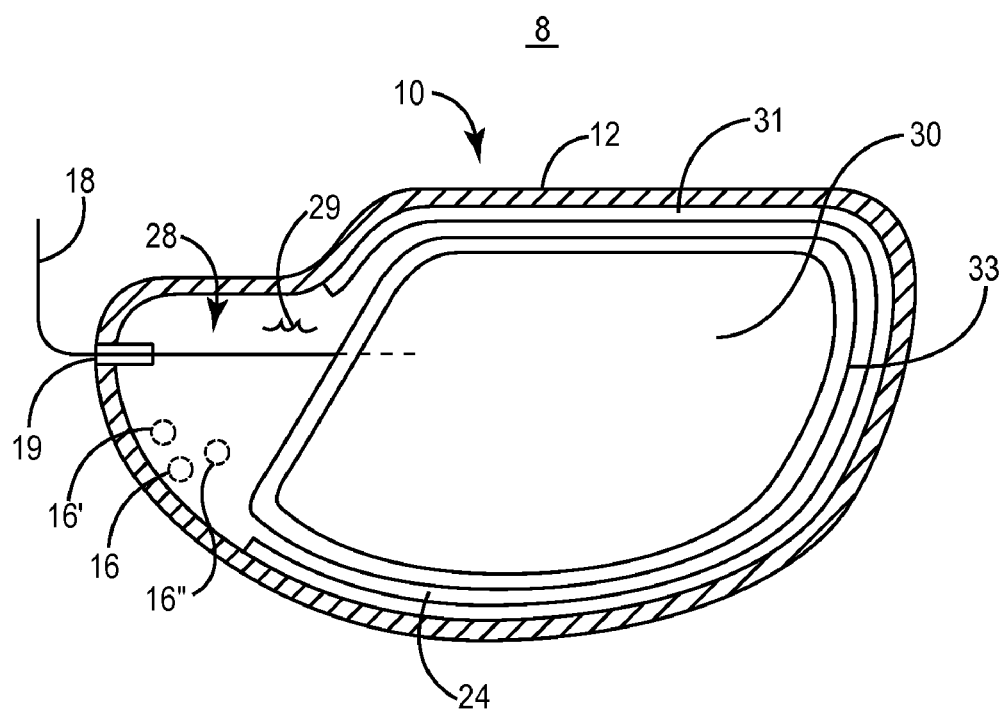
FIG. 2 is a top, sectional view of the electrochemical cell shown in FIG. 1.

FIG. 2 is a top, sectional view of the electrochemical cell 8 shown in FIG. 1. Encasement 10 encloses an interior space 24 for containing cell components. Encasement 10 is illustrated having a generally D-shaped, shallow drawn case 12. In various embodiments, encasement 10 may be of any shape and may include a shallow-drawn or deep-drawn case. Encasement 10 houses an electrode assembly including an anode 30 and cathode 31. Anode 30 and cathode 31 are separated by a separator layer 33. In some embodiments, anode 30 is sealed in a separator, which is commonly fabricated from a microporous polymer or Kraft paper. Anode 30 may be a valve metal anode formed from tantalum, aluminum, or titanium, for example. Cathode 31 includes an active electrode material deposited on a conductive substrate. For example a carbon-containing cathode material may be deposited on a tanatalum, aluminum, or titanium substrate. Cathode material 31 may be deposited on the interior surface of case 12. While a particular embodiment of an electrode assembly is shown in FIG. 2, any type of coiled, stacked, or other electrode assembly configuration may be used in electrochemical cell 8.

Terminal lead 18 is shown entering interior space 28 via a feedthrough 19 extending through case 12 in the header portion 28 of cell 8. Approximate locations of access ports 16, 16', and 16" are shown by dashed line. Access ports 16, 16' and 16" are shown located along the header portion 28 of cell 8 although access ports 16, 16' and 16" may be positioned anywhere on encasement 10. Access ports 16, 16' and 16" are shown located proximate each other, which facilitates performing leak testing after cell assembly. However, when multiple access ports are provided, the multiple access ports may be located at any distance apart on encasement 10. After assembling cell components within interior space 24 and sealing cover 14 to case 12, access ports 16, 16' and 16" are used to fill the remaining interior space 24, between anode 30 and cathode 31 and in header 28, with a liquid electrolyte 29. Electrolyte 29 is a conductive liquid having a high breakdown voltage and is typically a solution of water, organic solvents and weak acids, such as sulfuric acid.

Figure 3A:
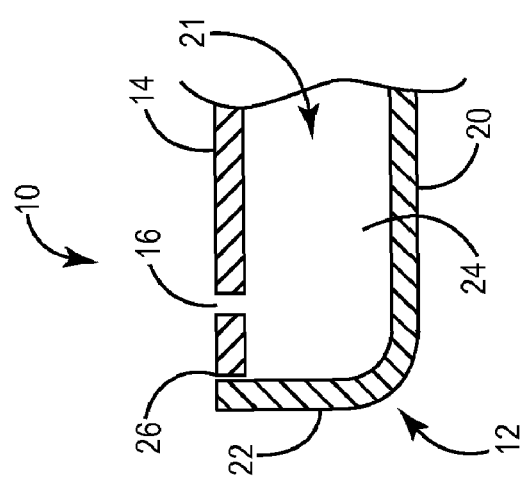
FIGS. 3A through 3C are side sectional views of an electrochemical cell encasement illustrating various locations of an access port in accordance with different embodiments of the invention.
Figure 3B:
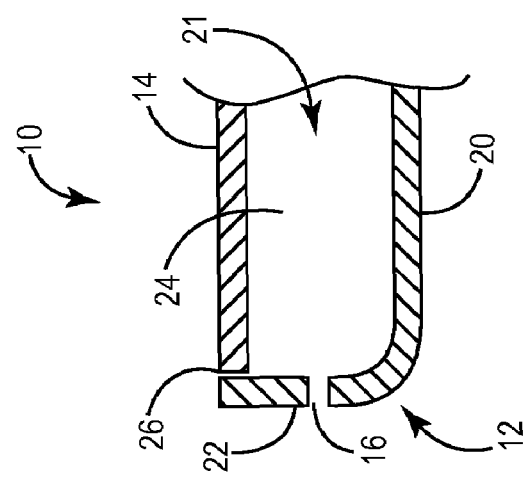
Figure 3C:
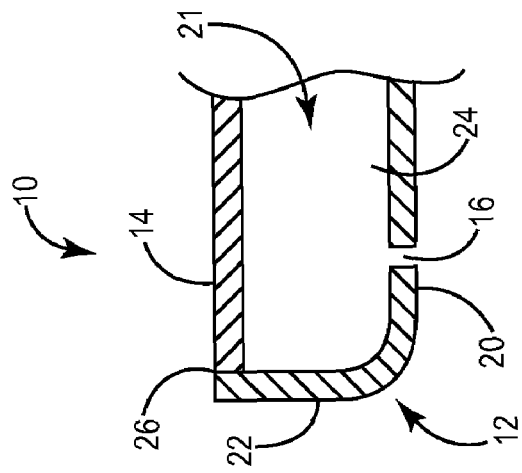

FIG. 3A through 3C are side sectional views of an electrochemical cell encasement illustrating various locations of an access port in accordance with different embodiments of the invention. Encasement 10 includes case 12 having a generally planar bottom 20 and sidewall 22 terminating at an open top 21 for receiving cover 14. Case 12 and cover 14 are hermetically sealed at joint 26 after assembling cell components within interior space 24, prior to filling cell 8 with a liquid electrolyte. In FIG. 3A, access port 16 is shown extending through cover 14. In FIG. 3B, access port 16 is shown extending through sidewall 22, and in FIG. 3C, access port 16 is shown extending through case bottom 20. Encasement 10 may be formed of titanium, stainless steel, aluminum, or any other weldable metal or polymer material. In one embodiment, encasement 10 is formed of titanium approximately 0.008 inches in thickness, and access port 16 is formed with a diameter of approximately 0.006 inches.

After assembling interior cell components and welding joint 26, the electrolyte is introduced into encasement 10 through access port 16. Filling is generally accomplished by applying a vacuum to cell 8 to evacuate air remaining in interior space 24. Access port 16 is positioned in a reservoir containing the electrolyte such that electrolyte is drawn through access port 16 to fill remaining interior space 24.

Figure 4:
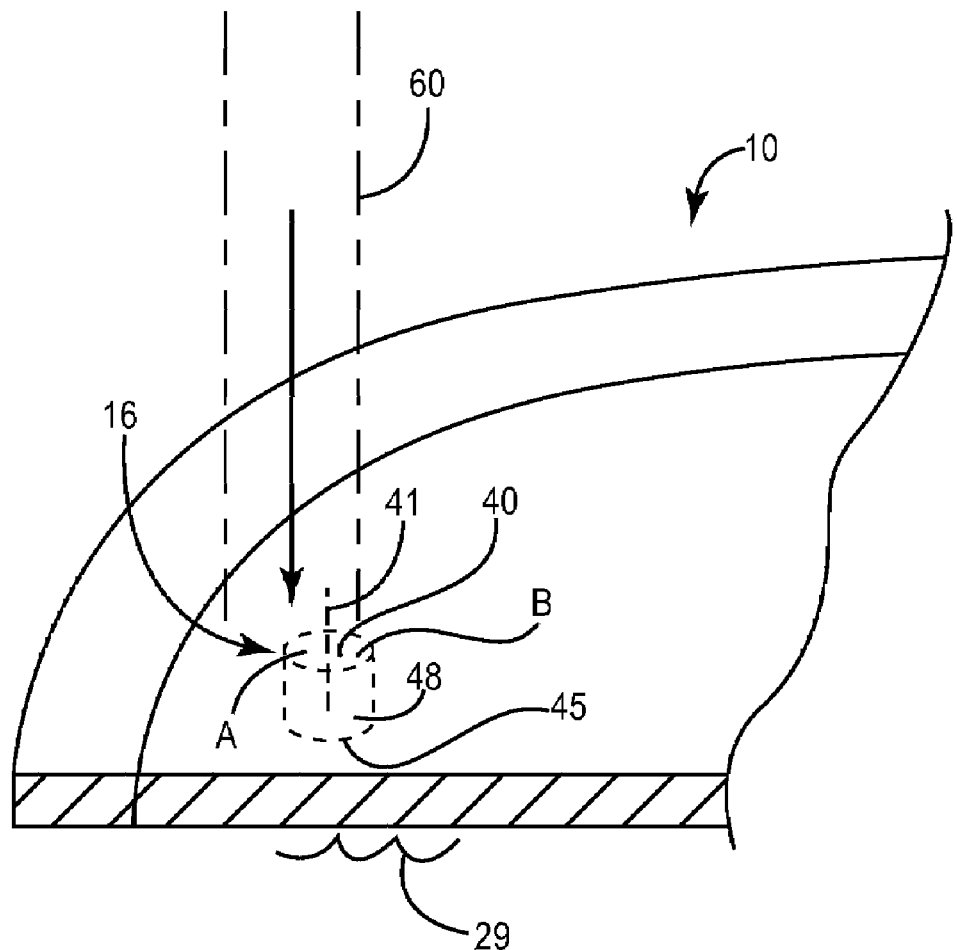
FIG. 4 illustrates a method for hermetically sealing an access port.

FIG. 4 illustrates a method for hermetically sealing access port 16. Access port 16 is sealed using a fusion welding technique, for example laser welding, arc welding, or plasma welding. Access port 16 is welded closed without using a filler member. In past practice, a fill port has been provided including a fill tube, a filler placed in the fill tube at the time of welding, and a ferrule to support the fill tube and filler. The filler may be provided as a ball, cap, button or any other member or material that is used in sealing the fill port opening. The encasement wall through which the fill port extends was provided thick enough to support the fill port components.

In accordance with the present invention, a filler member or material is not placed in the access port 16 prior to welding. Welding is performed with liquid electrolyte 29 present along interior aperture 45. In past practice, a filler placed in a fill port tube separated the weld joint from the liquid electrolyte such that the weld formed to seal the fill port was performed in the absence of the liquid electrolyte. In the embodiment shown in FIG. 4, weld beam 60 is applied to access port 16 for a short interval of time, i.e. pulsed, in the presence of electrolyte 29 to quickly wet exterior aperture 40. Limited volatilization of electrolyte 29 occurs during the pulsed laser weld beam application, preventing excessive gas formation that might otherwise yield a porous, ineffective weld joint. As used herein, the terms "in the presence of the electrolyte" in reference to welding or sealing the access port generally refers to welding or sealing the access port without the use of a filler member or material, placed in the access port lumen to separate the electrolyte from the weld joint.

The weld beam 60 is applied with an incident energy adequate to create a melt pool that seals at least the access port exterior aperture 40 and may extend into lumen 49 as far as interior aperture 45. Weld beam 60 may be directed approximately normal to the encasement surface as generally shown in FIG. 4 but may alternatively be directed at any angle as long as the incident beam delivers adequate energy to create a weld pool that seals access port 16. The weld beam 60 may be applied at one or more locations over access port 16 during the sealing process.

In one embodiment, as shown in FIG. 4, a weld beam 60 is directed toward a point that is located off a centerline 41 of aperture 40. By directing weld beam 60 off centerline 41, material is recruited from a larger area of the exterior surface of encasement 10 for participating in the weld pool. The wall thickness of encasement 10 can be made thinner than in past practice since encasement wall support of additional fill port components, such as a fill port ferrule and filler, is not needed. Directing weld beam 60 off centerline 41 also promotes the use of a thinner wall thickness of encasement 10 since material is drawn from a larger surface area of encasement 10 into the weld pool. In one embodiment, weld beam 60 is first applied over aperture 40 at a first point off of centerline 41, indicated approximately as point A in FIG. 4, and second at a second point off centerline 41, indicated approximately as point B, opposite the first point A. In this way, material is recruited from the adjacent encasement 10 on two sides of access port 16.

In other embodiments, weld beam 60 is directed approximately on a center point of aperture 40 creating an annular melt that fills exterior aperture 40. When the weld beam 60 is terminated, the melt pool solidifies, sealing access port 16. Aperture 40 is shown to be approximately circular in shape. A circular shape is generally easily manufactured in encasement 10. However, aperture 40 may be formed in any geometric shape as desired.

The laser weld beam 60 may be a pulsed Nd:YAG laser, however other laser types could be used including, but not limited to, fiber, $CO_2$, and other solid state or gas laser systems. A laser welding system used is selected based on the material, which may be a metal or a polymer, from which encasement 10 is formed. After sealing aperture 40, a leak test may be performed, such as a helium leak test, for verifying the integrity of the seal.

Figure 5:
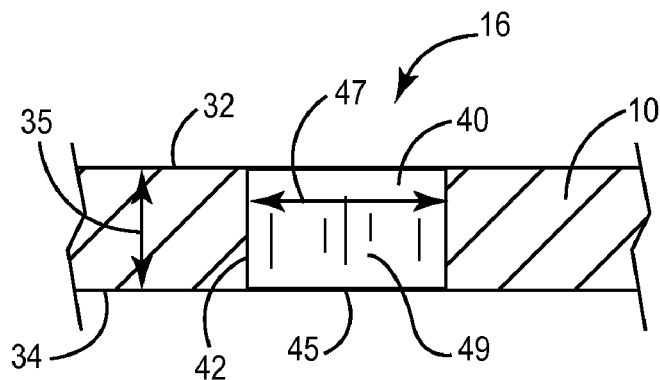
FIG. 5 is a side cut-away view of an access port for an electrochemical cell according to one embodiment of the invention.

FIG. 5 is a side cut-away view of an access port for an electrochemical cell according to one embodiment of the invention. Encasement 10 includes an exterior surface 32 and an interior surface 34 separated by a wall thickness 35 extending there between. The portion of encasement 10 shown in FIG. 5 may correspond to any portion of electrochemical cell cover 14 or case 12 (shown in FIG. 1). Access port 16 is formed extending through encasement 10 from exterior surface 32 to interior surface 34. Access port 16 includes a lumen 49 defined by lumen wall 42 extending between an exterior aperture 40 on exterior surface 32 of encasement 10 and an interior aperture 45 on interior surface 34 of encasement 10.

Access port wall 42 is normal to exterior surface 32 in the embodiment shown in FIG. 5. Access port 16 may be formed using a stamping, punching, or other cutting method in which exterior aperture 40 and interior aperture 45 are formed by stamping or otherwise cutting the material forming encasement 10 to remove material from encasement wall 35, thereby forming a straight cut access port wall 42 defining lumen 49.

Figure 6:
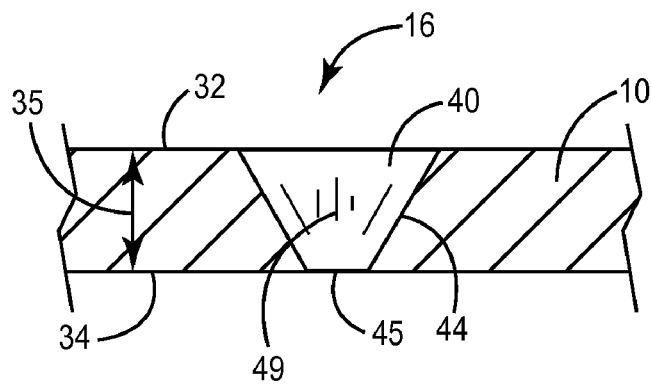
FIG. 6 is a side cut-away view of an alternative embodiment of an electrochemical cell access port.
Figure 7:
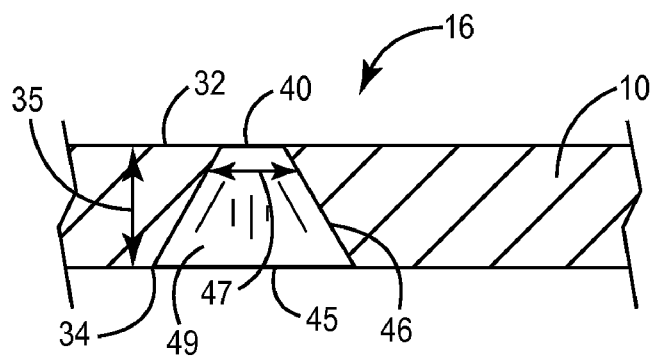
FIG. 7 is a side cut-away view of another embodiment of access port.

FIG. 6 is a side cut-away view of an alternative embodiment of an electrochemical cell access port. Access port 16 is provided with a tapered wall 44, defining lumen 49, extending from exterior aperture 40 to interior aperture 45. Wall 44 is tapered in a direction that results in an exterior aperture 40 larger than interior aperture 45. FIG. 7 is a side cut-away view of another embodiment of access port 16 wherein a tapered access port wall 46 is tapered in a direction that results in exterior aperture 40 being smaller than interior aperture 45. Tapered wall 44 or 46 may be formed using a tapered punch or other cutting method for removing material from encasement wall 35. When forming a straight-cut or tapered wall as shown in FIGS. 5, 6 and 7, a rough burr may remain along the cut edge depending on the encasement material and cutting method used. The burr may be trimmed and removed. Alternatively, the burr may remain, particularly when the burr is formed along exterior surface 32, to provide additional material to participate in the weld pool. The burr may disappear during the welding process.

Figure 8:
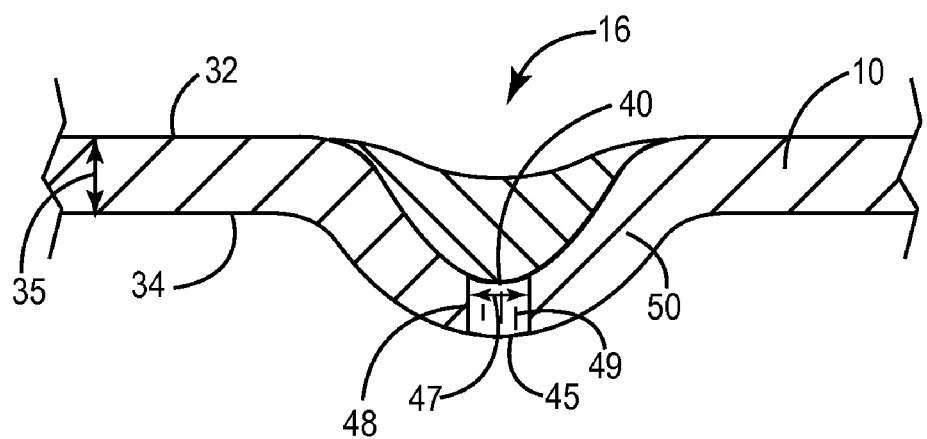
FIG. 8 is a side cut-away view of yet another embodiment of an electrochemical cell access port.

FIG. 8 is a side cut-away view of yet another embodiment of an electrochemical cell access port. In FIG. 8, access port 16 is formed having a shape that may generally be referred to as a "volcano" shape. Access port 16 includes concave wall 50, and lumen wall 48 defining lumen 49, extending between exterior aperture 40 and interior aperture 45. Access port 16 is formed by using a tool, such as a stamp, press or punch, to deform encasement wall 35 inward, thereby forming concave wall 50. A small amount of encasement wall material may be removed by stamping, cutting or punching to form lumen 49. Alternatively, encasement wall 35 is deformed inward until the encasement wall material fractures or tears to create lumen 49 extending between exterior aperture 40 and interior aperture 45. Access port 16 may thus be formed without actually removing material from encasement wall 35. As such, encasement wall material is retained for recruitment into the weld pool for sealing access port 16.

Figure 9:
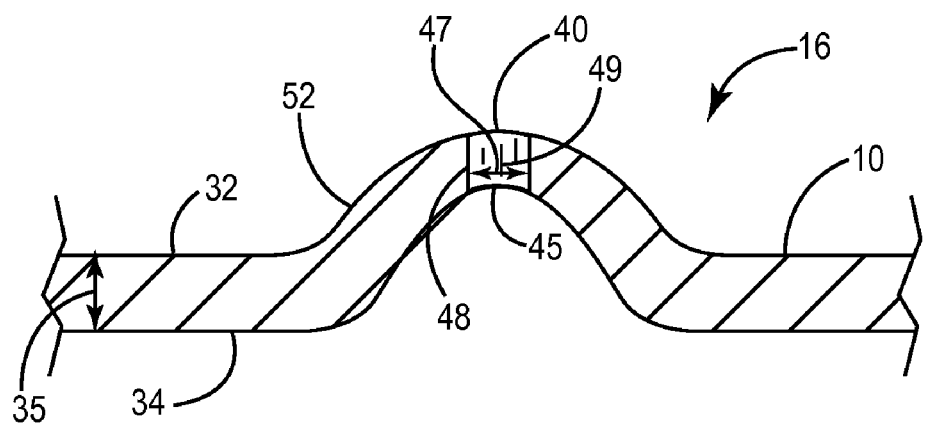
FIG. 9 is a side cut-away view of still another embodiment of an electrochemical cell access port.

It is appreciated that a "volcano" shaped access port may alternatively be formed by deforming encasement wall 35 outward as shown in FIG. 9, such that a convex wall 52 extends outward from encasement wall 35.

The size of the exterior aperture 40 included in any of the embodiments shown in FIGS. 5 through 9, indicated generally as distance 47, may be specified based on several design considerations. The size of exterior aperture 40, lumen 49, and interior aperture 45 will affect the maximum electrolyte filling rate achieved. A minimum aperture and lumen diameter may be specified in order to limit the maximum electrolyte filling time required during electrochemical cell manufacture.

When selecting the size of exterior aperture 40, the size of the weld beam used to access port 16 may also be taken into consideration. The weld beam is applied for a very short time interval to prevent thermal damage to interior cell components. For example, a laser weld beam may be applied in a pulse for approximately 5 ms, though shorter or longer time intervals may also be effective. In order to wet and reliably seal access port 16 within a short time interval, the distance 47 is limited relative to the diameter of the weld beam used. In one embodiment, distance 47 is approximately fifty percent or less than the weld beam diameter.

The size of exterior aperture 40 may also take into consideration the thickness of encasement wall 35. The amount of material available for recruitment in the weld pool will depend in part on the thickness of the adjacent material. If the size of exterior aperture 40 is too large relative to the thickness of encasement wall 35, the resulting weld joint may not completely seal exterior aperture 40 or form an unacceptably thin seal. By providing multiple access ports as shown previously in FIG. 1, an acceptable electrolyte filling rate may be achieved through a relatively small exterior aperture 40 formed through a thin encasement wall 35 while still reliably sealing exterior aperture 40 using a short welding time.

Thus, various electrochemical cell access port configurations have been presented in the foregoing description with reference to specific embodiments. It is appreciated that various modifications to the referenced embodiments may be made without departing from the scope of the invention as set forth in the following claims.

The invention claimed is:

1. An electrochemical cell, comprising:
   an encasement including a case having a bottom and a sidewall terminating at an open top and a cover disposed over the case open top and hermetically sealed to the case, the encasement defining an interior space for containing cell components; and
   an access port defining at least one lumen having a wall, the lumen wall extending through a wall thickness of the encasement and formed by an encasement material forming one of the case bottom, the case sidewall and the cover, the access port lumen provided for receiving a liquid electrolyte, the access port lumen being sealed closed after receiving the liquid electrolyte using a fusion welding method in the presence of the electrolyte, wherein the access port lumen is free of a filler material and fill port components.

2. The cell of claim 1 wherein the case is a shallow-drawn case.

3. The cell of claim 1 wherein the access port is sealed using a laser welding method.

4. The cell of claim 1 wherein the cell includes an anode formed from a material including a valve metal.

5. The cell of claim 4 wherein the anode is formed from a material including tantalum.

6. The cell of claim 1 wherein the encasement is formed from a material including any of: stainless steel, titanium, tantalum, and aluminum.

7. The cell of claim 1 wherein the encasement is formed from a material including a polymer.

8. The cell of claim 1 wherein the encasement is formed with any of the case, sidewall and cover having a thickness of approximately 0.008 inches or less.

9. The cell of claim 1 wherein the access port lumen wall includes a tapered side.

10. The cell of claim 1 wherein the access port lumen is approximately circular.

11. The cell of claim 1 wherein the encasement includes an exterior surface, and the access port includes an exterior aperture and a concave side extending inward from the encasement exterior surface to the exterior aperture.

12. The cell of claim 1 wherein the encasement includes an exterior surface, and the access port includes an exterior aperture and a convex side extending outward from the encasement exterior surface to the exterior aperture.

13. A method for manufacturing an electrochemical cell, comprising:
   forming an access port including an exterior aperture and an interior aperture and a side defining a lumen extending between the exterior aperture and the interior aperture, through a material forming an encasement of the electrochemical cell;

filling the electrochemical cell with a liquid electrolyte through the access port; and welding the access port lumen closed in the presence of the electrolyte, wherein the access port lumen is free of a filler material and filling components.

14. The method of claim 13 wherein forming the access port includes deforming the encasement material to form a concave wall.

15. The method of claim 13 wherein deforming the material includes using a tapered tool.

16. The method of claim 15 wherein deforming the material includes deforming the material until the material tears to form the lumen.

17. The method of claim 13 wherein welding the access port closed includes laser welding the access port closed.

18. The method of claim 13 wherein the access port exterior aperture includes a center line and welding the access port closed includes directing a weld beam at a location that is off the center line of the access port exterior aperture.

19. The method of claim 13 wherein welding the access port closed includes using a weld beam having a diameter of at least approximately twice a distance across the access port exterior aperture.

20. An electrochemical cell, comprising:

an encasement having an exterior surface, an interior surface, and a wall thickness extending between the exterior and interior surfaces; and an access port lumen formed through the encasement extending to an interior aperture formed along the encasement interior surface, the access port lumen being sealed closed using a fusion welding method in the presence of a liquid electrolyte at the interior aperture, the access port lumen being free of a filler material and fill port components, wherein material sealing the access port lumen being recruited only from the encasement.

* * * * *